(12) United States Patent
Chen

(10) Patent No.: US 6,823,036 B1
(45) Date of Patent: Nov. 23, 2004

(54) WRISTWATCH-TYPED PEDOMETER WITH WIRELESS HEARTBEAT SIGNAL RECEIVING DEVICE

(76) Inventor: Yu-Yu Chen, 2Fl., No. 349, Wushing St., Shinyi Chiu, Taipei (TW), 110

( * ) Notice: Subject to any disclaimer, the term of this patent is extended or adjusted under 35 U.S.C. 154(b) by 0 days.

(21) Appl. No.: 10/668,353

(22) Filed: Sep. 24, 2003

(51) Int. Cl.[7] .............................................. G01C 21/00
(52) U.S. Cl. ...................................................... 377/24.2
(58) Field of Search ........................................ 377/24.2

(56) References Cited

U.S. PATENT DOCUMENTS

| | | | | |
|---|---|---|---|---|
| 4,371,945 A | * | 2/1983 | Karr et al. ................... | 702/160 |
| 4,513,753 A | * | 4/1985 | Tabata et al. ................ | 600/519 |
| 4,855,942 A | * | 8/1989 | Bianco ......................... | 702/160 |
| 5,164,967 A | * | 11/1992 | Endo et al. .................. | 377/24.2 |
| 5,475,725 A | * | 12/1995 | Nakamura ................... | 377/24.2 |
| 5,491,474 A | * | 2/1996 | Suni et al. ............... | 340/870.31 |
| 5,622,180 A | * | 4/1997 | Tammi et al. ............... | 600/503 |
| 5,891,042 A | * | 4/1999 | Sham et al. ................. | 600/483 |
| 6,160,480 A | * | 12/2000 | Su-yueh ................... | 340/573.1 |
| 6,175,608 B1 | * | 1/2001 | Pyles et al. ................ | 377/24.2 |
| 6,302,789 B2 | * | 10/2001 | Harada et al. ................. | 463/7 |

* cited by examiner

*Primary Examiner*—Margaret R. Wambach
(74) *Attorney, Agent, or Firm*—Rosenberg, Klein & Lee

(57) ABSTRACT

A wristwatch-typed pedometer with wireless heartbeat signal receiving device includes a watch casing with a watch band for fitting to a user's wrist, a wireless heartbeat detector for detecting a heartbeat of the user and generating and transmitting a heartbeat signal wirelessly, and a pace signal sensor which is disposed in the watch casing for detecting a pace of the user and generating a pace signal. When a user puts on the wristwatch-typed pedometer and performs exercise, the heartbeat signal from the heartbeat detector is received by a wireless heartbeat receiving circuit of a control circuit and transmitted to a data processing unit. Moreover, the pace signal from the pace signal sensor is transmitted to the data processing unit via a pace signal receiving circuit of the control circuit. The data processing unit calculates and processes, and transmits the heartbeat signal and pace signal to a display unit for displaying.

12 Claims, 3 Drawing Sheets

WRISTWATCH-TYPED PEDOMETER WITH WIRELESS HEARTBEAT SIGNAL RECEIVING DEVICE

BACKGROUND OF THE INVENTION

1. Field of the Invention

The present invention relates to a body/motion signal receiving and display device, and more particularly to a wristwatch-typed pedometer with wireless heartbeat signal receiving device.

2. Description of the Prior Art

There are variety of body building devices and exercisers developed for people who live busily in the modern commercial society and require appropriate exercises. For a person to accurately control a moderate quantity of exercise and monitor personal physical condition, various types of body/motion signal sensing devices have been researched and developed.

Most conventional body signal sensing devices or motion signal sensing devices are designed to provide one single detecting and sensing function. That is, each type of conventional sensing device is able to detect and sense only one type of signal at a time. For example, there are a variety of heartbeat sensing devices commercially available. In U.S. Pat. No. 5,491,474, a telemetric transmitter unit is disclosed. The transmitter electronics is coupled to each electrode by means of a conductive plastic layer for transmission of signal. In U.S. Pat. No. 4,513,753, a heartbeat rate indicator in form of wristwatch is disclosed. Moreover, U.S. Pat. No. 5,622,180 describes a device for measuring heartbeat rate that includes a wrist strap with skin contact electrodes and a coil receiver for receiving telemetrically transmitted heartbeat signals either from a wireless receiver or from the skin contact electrodes.

Moreover, there are many types of pedometers in the market. For example, U.S. Pat. Nos. 4,371,945 and 5,164,967 disclose a pedometer for calculating a distance which a user walks, jogs or runs by electronically measuring the length of each stride taken by the use.

All of the aforesaid conventional body signal sensing devices and motion signal sensing devices are designed to have only one detecting and sensing function. That is, in practical use of these conventional sensing devices, they can detect and display only one type of signal. Body signal, for example heart beat rate, if it is evaluated together with the exercise intensity, type or exercise parameter, it is very useful and beneficial for athletes and sports fans. In fact, most of the products in market does not match the requirement above in practical way.

Some producers have devoted to develop a few body signal sensing devices with multiple functions. Take for an example. U.S. Pat. No. 5,891,042 discloses a fitness monitoring device that includes an electronic pedometer which responds to a user's body motion at each step and a wireless heart rate monitor which is wirelessly coupled to the electronic pedometer. The pedometer is fitted to the user's waist and the wireless heart rate monitor is fitted to the user's chest. The heartbeat signal is transmitted wirelessly to and is displayed on the pedometer. Practically, it is not easy and inconvenient for the user to view the data displayed on the pedometer.

Also, an electronic combined pulse meter and pedometer is taught in U.S. Pat. No. 5,475,725, in which a single sensor is used for determining the walking pace and pulse rate, and the data are displayed on the pedometer. In U.S. Pat. No. 6,302,789, a new pedometer with game mode is disclosed, which can be used as a game by a child to get some exercise such as walking and/or running without reluctance. U.S. Pat. No. 6,160,480 teaches a wireless inline skate or skate board pulse watch which is able to receive the user's body motion signal and heart rate pulse signal. Furthermore, U.S. Pat. No. 6,175,608 describes a pedometer which comprises a step counter and a heart rate monitor. The pedometer comprises a wireless receiver for receiving the pace signal and heart rate signal.

Although different pedometers are developed to enhance the functions of the pedometers, it is found that they possess some drawbacks that make it very inconvenience for use.

SUMMARY OF THE INVENTION

A primary object of the present invention is to provide a wristwatch-typed pedometer with wireless heartbeat signal receiving device for receiving and displaying body signal and motion signal of a user.

Another object of the present invention is to provide a wristwatch-typed pedometer with wireless heartbeat signal receiving device. The wristwatch-typed pedometer comprises a wireless heartbeat detector for detecting a heartbeat of a user and transmitting a heartbeat signal wirelessly and a pace signal sensor for detecting and counting an accumulated number of paces taken by the user.

To achieve the above and other objects, in accordance with the present invention, there is provided with a wristwatch-typed pedometer with wireless heartbeat signal receiving device. The wristwatch-typed pedometer comprises a watch casing with a watch band for fitting to a user's wrist, a wireless heartbeat detector for detecting a heartbeat of the user and generating and transmitting a heartbeat signal wirelessly, and a pace signal sensor which is disposed in the watch casing for detecting an accumulated paces of the user and generating a pace signal. When a user puts on the wristwatch-typed pedometer and performs exercise, the heartbeat signal from the heartbeat detector is received by a wireless heartbeat receiving circuit of a control circuit and transmitted to a data processing unit. Moreover, the pace signal from the pace signal sensor is transmitted to the data processing unit via a pace signal receiving circuit of the control circuit. The data processing unit calculates and processes, and transmits the heartbeat signal and pace signal to a display unit for displaying.

Preferably, the wristwatch-typed pedometer further comprises a speed calculation table memory which stores a reference table of stride length against pace per second. When the user performs an exercise, the data processing unit receives the pace signal from the pace signal sensor and calculates a speed of the user in step per second. Based on the speed of the user, the data processing unit then checks the reference table and obtains a corresponding stride length, and thereby calculates an accumulated walking distance and a speed of the user in length per unit time. Furthermore, the wristwatch-typed pedometer also comprises a calorie burned table memory which stores a personal data of the user including sex and weight, a calorie consumption database for various exercises and a calorie consumption database at different intensities. Thereby, the data processing unit calculates the calorie consumption of the user at exercise.

BRIEF DESCRIPTION OF THE DRAWINGS

The present invention will be apparent to those skilled in the art by reading the following description of the best mode and a preferred embodiment of a device for carrying out the present invention, with reference to the attached drawings, in which.

DETAILED DESCRIPTION OF THE PREFERRED EMBODIMENTS

Figure 1:
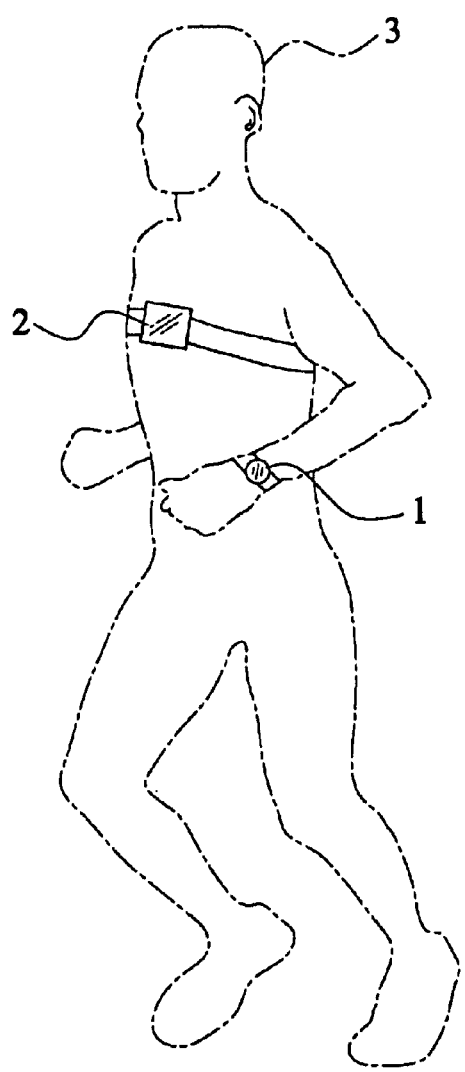
FIG. 1 schematically shows that a wristwatch-typed pedometer with wireless heartbeat signal receiving device constructed in accordance with the present invention is fitted on a user's wrist.
Figure 2:
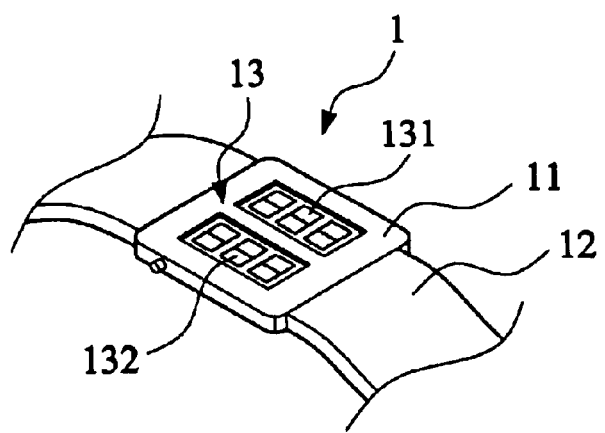
FIG. 2 is perspective view of the wristwatch-typed pedometer of the present invention.

With reference to the drawings and in particular to FIGS. 1 and 2, FIG. 1 shows that a wristwatch-typed pedometer with wireless heartbeat signal receiving device constructed in accordance with the present invention is fitted on a user's wrist, and FIG. 2 shows a perspective view of the wristwatch-typed pedometer. The wristwatch-typed pedometer 1 comprises a watch casing 11 with a watch band 12 extending from the two corresponding sides of the watch casing 11 for fitting on the user's wrist. The watch casing 11 comprises a display unit 13 which includes a heartbeat signal display 131 and a pace signal display 132 for separately displaying a heartbeat and an accumulated number of paces of walking, jogging or jumping taken by the user at exercise.

The wristwatch-typed pedometer 1 is used in coordination with a body signal detecting device for detecting the user's body signal and a body signal receiving circuit coupled with a data processing unit for receiving and processing the body signal from the detector. The body signal may include a heartbeat signal or an electrocardiogram signal.

In a preferred embodiment of the present invention, the body signal detecting device comprises a wireless heartbeat detecting device 2 which is fitted on the chest on the user 3 for detecting a heartbeat of the user 3. The wireless heartbeat detecting device 2 comprises a heartbeat detector 21 and a wireless transmitter 22. The heartbeat detector 21 detects the heartbeat of the user and transmits a heartbeat signal wirelessly to a wireless heartbeat signal receiving circuit 41 disposed in the watch casing 11.

Figure 3:
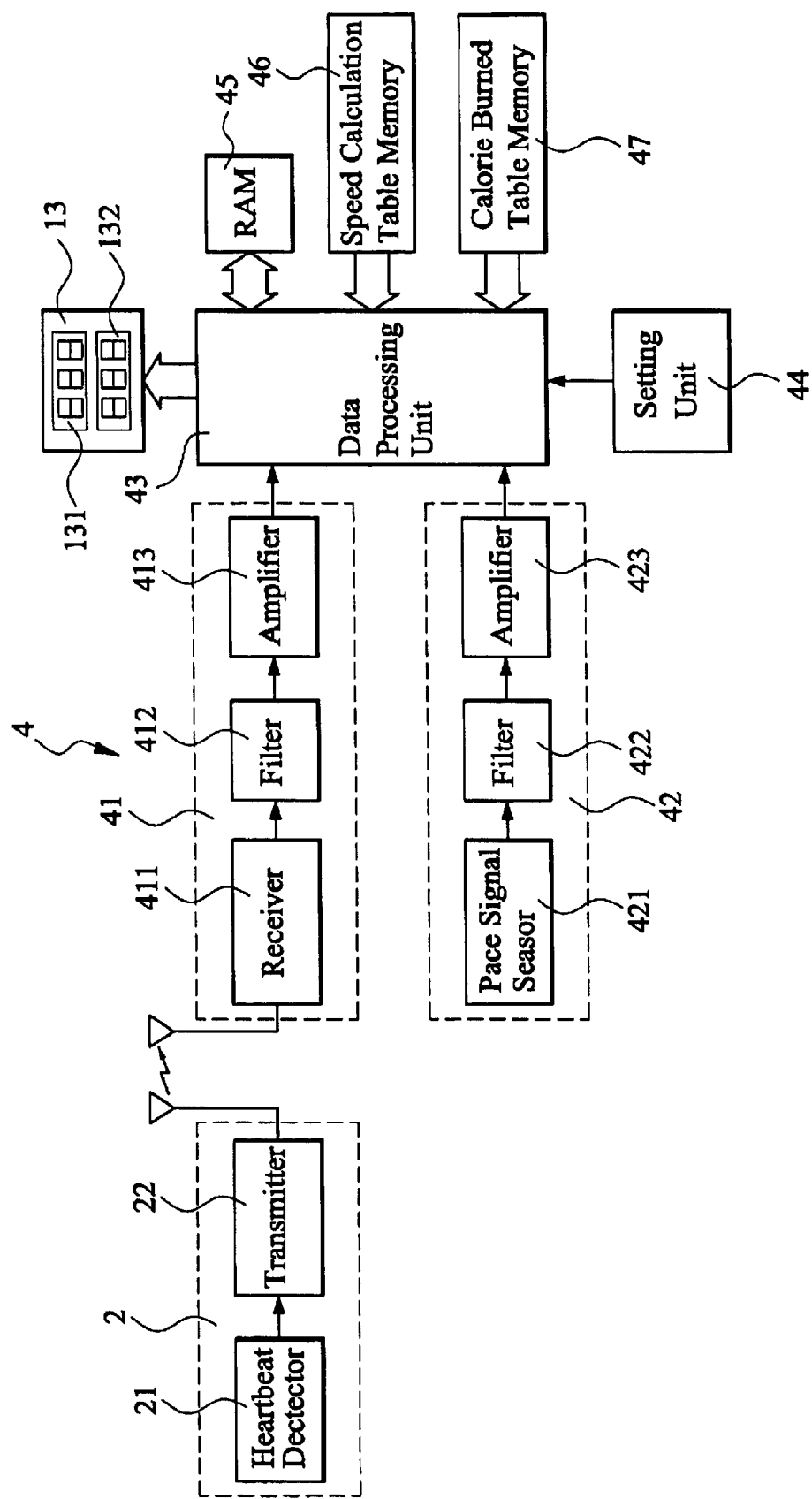
FIG. 3 is a block diagram showing a control circuit of the wristwatch-typed pedometer constructed in accordance with a preferred embodiment of the present invention.

Please refer to FIG. 3 which shows a block diagram of a control circuit of the wristwatch-typed pedometer in accordance with a preferred embodiment of the invention. The control circuit 4 comprises a wireless heartbeat signal receiving circuit 41 and a pace signal receiving circuit 42. The wireless heartbeat signal receiving circuit 41 comprises a wireless receiver 411 for receiving the heartbeat signal wirelessly from the wireless heartbeat detecting device 2.

The receiver 411 transmits the heartbeat signal to a filter 412 for filtering the noise. The filtered heartbeat signal is forwarded to an amplifier 413 to amplify the heartbeat signal. Then, the heartbeat signal is transmitted to a data processing unit 43 which calculates and processes the heartbeat signal. The data processing unit 43 transmits the heartbeat signal to the heartbeat signal display 131 of the display unit 13 for displaying.

The pace signal receiving circuit 42 comprises a pace signal sensor 421 which detects an accumulated number of paces of the user at walking, jogging or jumping. The pace signal sensor 421 may comprise a pace sensing device that is capable to detect vibration, e.g. a mechanical vibration sensor, ceramic shock sensor or acceleration sensor.

The pace signal detected by the pace signal sensor 421 is forwarded to a filter 422 for filtering the noise. The filtered pace signal is transmitted to an amplifier 423 for amplifying and then transmitted to the data processing unit 43 for calculating and processing. Subsequently, the pace signal is transmitted to the pace signal display 132 of the display unit 13 for displaying.

The data processing unit 43 is coupled with a setting unit 44 for setting the various parameters and formulae. Also, the data processing unit 43 is coupled with a random access memory (RAM) 45 for a temporary storage of the heartbeat signal, pace signal and various data.

Moreover, the data processing unit 43 is coupled with a speed calculation table memory 46 which stores a reference table of stride length against pace per second. When the user 3 performs an exercise, the number of paces taken by the user 3 in a predetermined time is detected by the pace signal sensor 421 which generates and transmits the pace signal to the data processing unit 43. The data processing unit 43 calculates and generates a speed of the user 3 in step per second. Based on the speed of the user 3, the data processing unit 43 then checks the reference table stored in the speed calculation table memory 46 and obtains a corresponding stride length, and thereby calculates an accumulated distance and a walking speed of the user 3 in length per unit time.

Basically, the data in the reference table come from statistics. Practically, the stride length of a user 3 may be varied from person to person. To generate an accurate pace data, the user 3 may set his stride length to the speed calculation table memory 46 via the setting unit 44. Moreover, the speed calculation table memory 46 may comprise a formula which is defined by the user 3 and is an expression of a relationship between stride length and speed in step per second for calculation of the stride length at a fixed speed.

Furthermore, the data processing unit 43 is connected with a calorie burned table memory 47 which stores a personal data of the user 3 including sex and weight, a database of calorie consumption for various exercises and a database of calorie consumption at different intensities. As mentioned, the data processing unit 43 calculates the speed of the user 3. The speed reflects the exercise intensity of the user 3. Based on the speed and weight of the user 3, the data processing unit 43 calculates a calorie consumption of the user 3.

In application, the user 3 just has to put on the wristwatch-typed pedometer 1 with wireless heartbeat signal receiving device on his wrist. When the user 3 performs exercise, the wireless heartbeat detecting device 2 detects the heartbeat of the user 3 and displays a heartbeat signal on the heartbeat signal display 131 of the watch casing 11. The watch casing 11 also displays the pace signal of the user 3 at walking, jogging and jumping. Accordingly, the user 3 is able to monitor his body signal and control his exercise quantity.

Moreover, the coordination of the components of the present invention enables the use of one single channel for transmission of both the heartbeat signal and pace signal. In comparison with the conventional pedometer, in which two carrier frequencies are required, the present invention is greatly improved and Although the present invention has been described with reference to the preferred embodiments thereof, it is apparent to those skilled in the art that a variety of modifications changes may be made without departing from the scope of the present invention which is intended to be defined by the appended claims.

What is claimed is:

1. A wristwatch pedometer comprising:

a watch casing including a watch band for fitting to a user's wrist;

a pace signal sensor disposed in the watch casing for detecting the user's paces and generating a series of pace signals corresponding thereto;

a data processing unit coupled to the pace signal sensor for calculating and processing the pace signals; and a speed calculation table memory coupled to the data processing unit for storing a reference table of stride length against speed in paces per second;

wherein based on the pace signals, from the pace signal sensor, the data processing unit calculates and generates a speed of the user in steps per second and then checks the reference table stored in the speed calculation table memory and obtains a corresponding stride length, and thereby calculates an accumulated distance and a walking speed of the user in length per unit time.

2. The wristwatch pedometer as claimed in claim 1, further comprising a setting unit which is coupled to the data processing unit for setting of a stride length to the speed calculation table memory.

3. The wristwatch pedometer as claimed in claim 1, wherein the speed calculation table memory further comprises a formula which is defined by the user and is an expression of relationship between stride length and speed in step per second for calculation of the stride length at a fixed speed.

4. The wristwatch pedometer as claimed in claim 1, further comprising a calorie burned table memory which stores a personal data of the user including sex and weight, a database of calorie consumption for various exercises and a database of calorie consumption at different intensities, and thereby the data processing unit refers to the calorie bunted table memory and calculates a calorie consumption of the user.

5. The wristwatch pedometer as claimed in claim 4, wherein the data processing unit calculates the calorie consumption of the user based on an exercise intensity which is indicated by the speed of the user.

6. The wristwatch pedometer as claimed in claim 1, further comprising a display unit which is coupled to the data processing unit for displaying the accumulated number of paces, accumulated walking distance and walking speed of the user.

7. A wristwatch pedometer comprising:

a watch casing including a watch band for fitting to a user's wrist;

a pace signal sensor disposed in the watch casing for detecting an accumulated number of paces of the user and generating a series of pace signals;

a wireless body signal detecting device for detecting a human physiological signal of the user;

a data processing unit coupled to the pace signal sensor for receiving the pace signals and receiving the human physiological signal from the wireless body signal detecting device, the data processing unit calculating and processing the pace signals;

a speed calculation table memory connected to the data processing unit and storing a reference table of stride length against speed in paces per second, the data processing unit calculating a speed of the user in steps per second and accumulated distance based on the pace signals from the pace signal sensor and a corresponding stride length from the reference table to; and a display unit connected to the data processing unit for displaying the pace signals and the human physiological signal from the data processing unit.

8. The wristwatch pedometer as claimed in claim 7, further comprising a setting unit which is connected to the data processing unit for setting a stride length to the speed calculation table memory.

9. The wristwatch pedometer as claimed in claim 7, wherein the speed calculation table memory further comprises a formula which is defined by the user and is an expression of a relationship between the stride length and the speed in step per second for calculation of the stride length at a fixed speed.

10. The wristwatch pedometer as claimed in claim 7, further comprising a calorie burned table memory which stores a personal data of the user including sex and weight, a database of caloric consumption for various exercises and a database of calorie consumption at different intensities, and the data processing unit refers to the calorie burned table memory and thereby calculates a calorie consumption of the user.

11. The wristwatch pedometer as claimed in claim 10, wherein the data processing unit calculates the calorie consumption of the user based on an exercise intensity which is indicated by the speed of the user.

12. The wristwatch pedometer as claimed in claim 7, wherein the body signal detecting device comprises a wireless heartbeat detecting device for detecting a heartbeat of the user.

* * * * *